Aug. 4, 1931.  D. H. BELL  1,817,287

METHOD OF PRODUCING SHOE SOLES OF MOLDED PLASTIC COMPOSITION

Filed Dec. 9, 1929

Inventor:
Donald H. Bell
by Heard Smith & Tennant.
Attys.

Patented Aug. 4, 1931

1,817,287

UNITED STATES PATENT OFFICE

DONALD H. BELL, OF BEVERLY, MASSACHUSETTS

METHOD OF PRODUCING SHOE SOLES OF MOLDED PLASTIC COMPOSITION

Application filed December 9, 1929. Serial No. 412,680.

This invention relates to improvements in methods of producing molded articles from plastic composition and in articles produced by said process, and broadly comprises the method of producing a plurality of molded articles of plastice composition from a mass of plastic material by producing a unit having different faces presenting desired contours for such articles, and then dividing the unit upon a predetermined plane or planes to produce the desired article.

More particularly the invention relates to improvements in shoe soles and processes of producing such shoe soles from plastic composition, such as rubber composition, by molding a mass of the plastic composition in a mold having opposite faces corresponding respectively to the tread surfaces of a shoe sole and of a depth at least twice that of the desired sole to produce a double-face unit, then splitting the unit longitudinally in a plane parallel to the tread surfaces of the unit, thereby producing a pair of right and left soles.

In the usual manufacture of articles from plastic composition, and particularly in the manufacture of soles for shoes made of plastic composition, such as rubber composition, a mass of the composition is molded and usually vulcanized in a two-part mold, each article or sole being made separately. In thus producing the articles, which are molded under heat and pressure, all of the external surfaces of the soles, which conform to the faces of the molds, are condensed to a greater degree than the interior of the soles and present smooth surfaces.

Where left and right soles are molded separately they vary more or less in size and contour. By the present invention the left and right soles are of identical form and contour.

Composition or rubber soles of this character are usually cemented to the inner soles of the shoes and usually are also secured thereto by stitching to the welt and by nailing to the heels, although in more recent practice such composition outer soles are cemented to the inner soles under pressure.

The upper surfaces of soles which are thus separately molded are so condensed and of such a smooth character as to prevent substantial penetration of the cement into the surface to which it is applied, and consequently such cemented soles are likely to break away, either in part or in whole, from the inner sole to which they are cemented.

By the present invention the upper surfaces of each right and left sole presents a porous, slightly roughened, surface adapted to permit such penetration of the cement as to insure proper adhesion to the inner sole of the shoe, thereby preventing the possibility of detachment from the inner sole or the formation of air pockets between the inner and outer soles.

The opposite faces of the plastic mass may be molded to provide ground-gripping ribs or depressions, or to present any desired surface ornamentation.

Suitable apparatus for molding the soles and the manner in which the unit is split, and also the forms of the right and left soles, are illustrated in the accompanying drawings, in which, Fig. 1 is a vertical sectional view of a mold containing a mass of molded rubber composition forming a unit;

Figure 1:
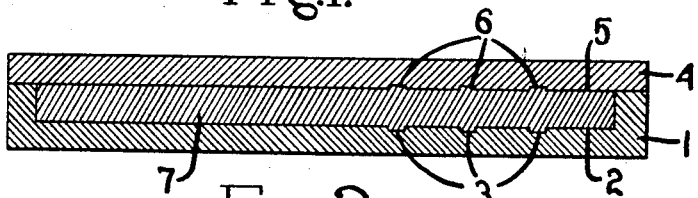
Figure 2:
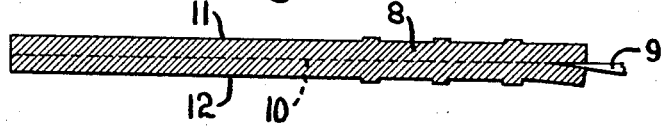
Fig. 2 illustrates the unit removed from the mold and also shows the knife entering the end of the molded unit and in a dotted line the plane upon which the unit is split longitudinally.
Figure 3:
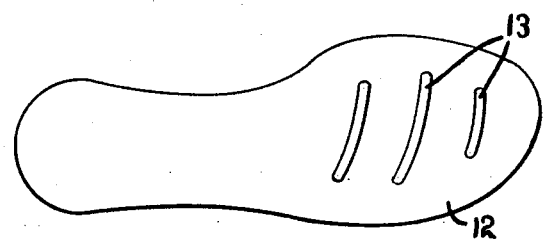
Fig. 3 is a plan view of the tread surface of a left sole.
Figure 4:
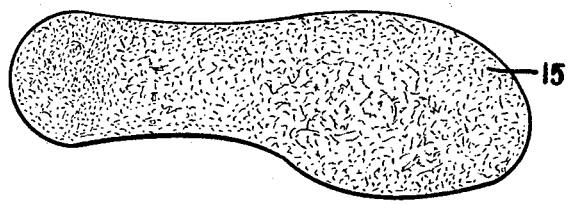
Fig. 4 is a plan view of the upper surface of the left sole.
Figure 5:
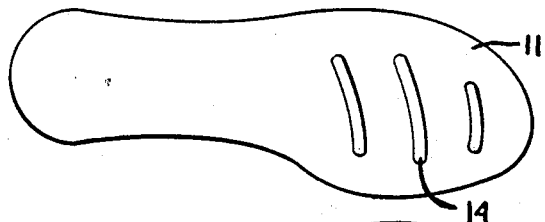
Fig. 5 is a plan view of the tread surface of the right sole.
Figure 6:
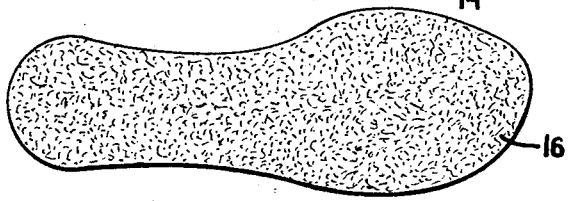
Fig. 6 is a plan view of the upper surface of the right sole.

The mold as illustrated comprises a two-part mold having a lower mold section 1 provided with a cavity 2 conforming to the shape of a sole and if desired provided with recesses 3 in which ribs, providing cleats, or other suitable ground-gripping means, are formed upon the unit. The upper mold section 4 is provided with a cavity 5, preferably also equal to the thickness of the desired sole, and is likewise provided with recesses 6 complementary to the recesses 3, but arranged in reverse direction. A mass 7 of plastic composition, such as rubber composition, is placed in the lower mold cavity 2, the upper mold section then applied and subjected to vulcanizing heat and pressure as is usual in the casting of articles of this character. The molded unit 8 is then removed from the mold and is split by a suitable knife 9 along a plane 10 parallel to and equidistant from the upper and lower surfaces 11 and 12 which correspond to the tread surfaces of the soles. The cavities 3 and 6 respectively cause the production of ribs 13 and 14 forming cleats upon the respective soles.

The upper surfaces 15 and 16 of the respective left and right soles are of somewhat porous and rough nature, as above described, adapted to permit the penetration of cement.

By thus casting the soles, the tread surfaces 11 and 12 and the peripheral surfaces of the soles, which are formed by contact with the faces of the mold, are condensed and because of the smooth faces of the mold cavity are very smooth, thereby providing soles having a neat appearance and capable of withstanding wear.

Obviously the invention may be employed to produce pairs of heels or any other types of devices having like faces, or faces presenting different surface contour or ornamentation.

By reason of the present invention a very great saving is made particularly in the construction of soles, heels, and like articles. By utilizing a single mold, instead of two molds, the cost of mold investment is cut substantially in half. The labor cost of molding likewise is substantially cut in half. The necessary investment in presses for compressing the mold and vulcanizing the rubber is likewise reduced aproximately one-half over that which would be required for separate molds for each of the articles. Furthermore, the overhead is greatly reduced as the output in a given factory space and with the same equipment is substantially double. Furthermore, the time required to produce a given number of soles is approximately reduced by one-half and there is a considerable saving of material which otherwise would be wasted in the molding of individual articles by reason of reduction of overflow, etc.

It will be readily understood that while the invention has been herein described as applied to the production of soles and heels for shoes, it is also applicable to the production of other articles having similar or dissimilar faces. Furthermore, in producing certain forms of articles the unit may be split along more than a single plane to produce the desired articles.

It will, therefore, be understood that the particular embodiments of the invention disclosed herein are illustrative in character and are not restrictive. It will also be understood that other apparatus for molding the articles may be employed, or that the molding operation may in some instances be performed by hand, within the meaning and scope of the following claims.

Having thus described the invention, what is claimed as new, and desired to be secured by Letters Patent, is:

1. The process of producing a pair of shoe soles from plastic material which comprises molding and vulcanizing by heat and pressure while in the mold a suitable plastic material to produce a unit having opposite faces corresponding respectively to the tread surface of a shoe sole and of a thickness twice that of the desired sole, then dividing said unit longitudinally along a central plane parallel to the upper and lower surfaces of the unit, thereby providing a pair of soles having smooth condensed tread surfaces and edges with exactly complementary peripheries and with each sole presenting a rough and porous upper surface adapted to be securely cemented to the inner sole of the shoe.

2. The process of producing a pair of shoe soles of rubber composition which comprises casting a mass of rubber composition in a mold, subjected to vulcanizing heat and pressure, and having opposite faces provided with designs in intaglio or relief corresponding respectively to the tread surfaces of a right and left shoe sole and of a depth twice that of the desired sole to produce a unit, then cutting the unit longitudinally along a central plane parallel to the respective tread surfaces of the unit to produce a pair of complementary soles each having smooth and condensed surfaces presented by the tread, edges and designs, and a flat rough and porous upper surface adapted to be securely cemented to the inner sole of the shoe.

In testimony whereof I have signed my name to this specification.

DONALD H. BELL.